United States Patent [19]

Edwards et al.

[11] Patent Number: 4,889,425

[45] Date of Patent: Dec. 26, 1989

[54] LASER ALIGNMENT SYSTEM

[75] Inventors: Frank E. Edwards, Everett; Stephen W. Wilcken, Seattle, both of Wash.

[73] Assignee: The Boeing Company, Seattle, Wash.

[21] Appl. No.: 115,202

[22] Filed: Nov. 2, 1987

[51] Int. Cl.$^4$ .................. G01B 11/26; G01C 1/10; G01C 3/00

[52] U.S. Cl. .................. 356/152; 33/263; 33/266; 33/279; 33/286; 33/288; 250/578; 356/149; 356/153; 356/250; 356/400

[58] Field of Search ........ 356/141, 152, 149, 153-155, 356/250, 400, 32; 33/263, 266, 276, 278-280, 286, 288, 264, 281; 250/578; 358/107

[56] References Cited

U.S. PATENT DOCUMENTS

| | | | |
|---|---|---|---|
| 2,692,527 | 10/1954 | Wetzel et al. | 88/14 |
| 3,197,643 | 7/1965 | Morris | 250/210 |
| 3,267,794 | 9/1966 | Howe | 88/14 |
| 3,532,892 | 10/1970 | Murphy | 250/203 |
| 3,535,525 | 10/1970 | Minkowitz | 250/208 |
| 3,551,057 | 12/1970 | Hamilton et al. | 356/172 |
| 3,603,691 | 9/1971 | Hamilton | 356/152 |
| 3,723,013 | 3/1973 | Stirland et al. | 356/400 X |
| 3,739,176 | 6/1973 | Thorn | 250/203 |
| 3,857,638 | 12/1974 | Bory | 356/153 |
| 3,881,107 | 4/1975 | Bory | 250/234 |
| 3,942,894 | 3/1976 | Maier | 356/153 |
| 3,983,375 | 9/1976 | Johnson | 235/151.3 |
| 4,038,890 | 8/1977 | Winget | 82/5 |
| 4,123,143 | 10/1978 | Yachin et al. | 350/171 |
| 4,155,096 | 5/1979 | Thomas et al. | 358/125 |
| 4,168,123 | 9/1979 | Price | 356/152 |
| 4,346,994 | 8/1982 | Cruz | 356/152 |
| 4,381,548 | 4/1983 | Grossman et al. | 364/551 |
| 4,513,504 | 4/1985 | Nussbaumer et al. | 33/1 |
| 4,530,602 | 7/1985 | Pomphrey, Jr. | 356/153 X |
| 4,627,725 | 12/1986 | Nishio et al. | 356/152 |
| 4,798,461 | 1/1989 | Pavlin et al. | 356/152 X |

Primary Examiner—Thomas H. Tarcza
Assistant Examiner—Linda J. Wallace
Attorney, Agent, or Firm—Dellett, Smith-Hill & Bedell

[57] ABSTRACT

A system for monitoring changes in shape of a structure employs a laser source attached to the structure and a set of beam splitters mounted at various locations on the structure and arranged to route portions of a laser beam produced by the laser source into various video cameras also mounted on the structure. Each video camera includes a photodetector array and produces an output signal indicating the intensity of light detected by each photodetector of the array, thereby indicating the beam intensity distribution in a corresponding plane of interest. The video output signal of each camera is digitized and stored as an intensity data array in the memory of a digital computer. The computer calculates from the intensity data array the position of the centroid of the beam with respect to a reference point on the plane of interest using a least squares fit of the intensity data to a two-dimensional Gaussian intensity distribution. Any deviation of the calculated beam centroid position from the reference point indicates a change in jig shape in the plane of interest. The reference point in each plane of interest is determined by a least squares fit of the computed beam centroids in several planes to a line.

21 Claims, 6 Drawing Sheets

LASER ALIGNMENT SYSTEM

BACKGROUND OF THE INVENTION

The present invention relates to systems for monitoring changes in shape of a structure.

A jig is a framework for holding and aligning parts being assembled. A large jig used to assemble a large structure, such as an aircraft body, tends to change shape due to changes in the foundation on which the jig rests, in ambient temperature, and in loads carried. Since changes in shape affect the alignment of parts being held, a large jig is suitably fitted with mechanisms which enable operators to adjust jig shape. However, in order to properly adjust the shape of a jig, it is necessary to provide a means for accurately monitoring jig shape.

Jig shape can be ascertained by monitoring the alignment of a set of points on the jig with respect to one or more reference lines. The points to be monitored are selected in such a way that the amount and direction of deviation of a point from proper alignment provides an indication of how to adjust one or more jig adjustment mechanisms. A number of systems have been developed to monitor the alignment of selected points on a structure with respect to lines defined by the paths of laser beams. A typical system of the prior art is described in U.S. Pat. No. 3,603,691, issued Sept. 7, 1971 to Ralph A. Hamilton, wherein laser beams are directed at photodetectors mounted at various points of interest on the jig. As the jig changes shape, the photodetectors move with respect to the laser beams and the portion of a beam striking each photodetector changes, thereby affecting the magnitude of the output signal of each photodetector. Hamilton utilizes a set of four photodetectors at each point on the jig where two-dimensional motion of the jig in a plane orthogonal to the laser beam is of interest. The centroid of the beam along each of two orthogonal axes in the plane is determined by linear interpolation of relative magnitudes of the output signals produced by a pair of photodetectors spaced along each axis. Hamilton uses three laser beams to monitor changes in jig shape with six degrees of freedom. All three laser beams are aligned in parallel with two beams contained within a common vertical plane and the third beam being contained within another vertical plane.

Hamilton indicates the system is capable of detecting displacements of 0.005 inches at distances of 200 feet. However, in assembly of large aircraft bodies the ability to detect displacements an order of magnitude smaller would be beneficial. The accuracy and resolution with which Hamilton's system can measure jig alignment is limited by the accuracy and resolution of the linear interpolation method used to locate the centroid of the beam as it strikes the photodetectors. The cross-sectional intensity distribution of a laser beam in the plane orthogonal to the beam is usually a non-linear Gaussian distribution, and determination of the centroid of the beam by linear interpolation of the magnitudes of photodetector output signals can be inaccurate. In addition, the direction of a laser beam tends to drift somewhat over time due to temperature change in the laser apparatus, and due to bending, movement or compression of the platform upon which the laser source is mounted or fluctuations in air density. A drifting laser beam delivers a false impression of jig movement, particularly at points remote from the laser source.

SUMMARY OF THE INVENTION

In accordance with one aspect of the invention, a laser alignment system employs a single laser beam and a set of optical beam splitters mounted in optical housings located at various positions on the jig. Each beam splitter may retransmit a portion of the beam without changing its direction, and may reflect the remaining portion of the beam in a direction orthogonal to the beam. Reflected and/or retransmitted portions of the beam continue on to other beam splitters attached to the jig, and the beam splitters are arranged on the jig so that portions of the same laser beam are directed through several planes of interest. At each plane of interest, a beam splitter reflects or retransmits a portion of the beam onto a large photodetector array in a solidstate video camera head located near the beam splitter. The video camera produces an output signal indicating the intensity of light detected by each photodetector of the array, thereby describing the beam intensity distribution in the corresponding plane of interest.

The video output signal of each camera is digitized and stored within the memory of a digital computer as a two-dimensional array of data values associated with picture elements ("pixels"). The array location and digital value associated with each pixel respectively correspond to a separate position on the photodetector array, and the beam intensity at that position. Image processing software may determine, from the array location and digital value associated with each pixel, the position of the centroid of the beam in each plane of interest monitored by a video camera using a method of least squares fit of the intensity data to a two-dimensional Gaussian intensity distribution. Any deviation of the calculated beam centroid position from a reference point indicates a change in jig shape in the plane of interest. Use of a video camera having a photodetector array employing a large number of photodetectors, in combination with a method of a least squares fit of photodetector intensity distribution to a Gaussian intensity distribution, yield a theoretical positioning accuracy of $+/-0.000034$ inches, given a pixel dynamic range of 8 bits, a 5 mm diameter laser spot, and a maximum 85% photodetector saturation (at beam center). In practice, this accuracy can be achieved if the laser beam is totally enclosed in a beam conduit to minimize air turbulence. Using beam conduits, centroid measurements repeatable to $+/-0.0001$ inch over a beam path of 140 feet have been observed.

In accordance with another aspect of the invention, the reference point on each plane of interest is determined from an "estimated" beam path. On system initialization, a three-dimensional (x,y,z) coordinate system is established for each x,y plane of interest monitored by a video camera, where the z-axis of each coordinate system is aligned along the first calculated beam centroid intersection with each x,y plane. Thereafter, when the beam centroid in one or more of the planes is recalculated from new intensity data, the path of the beam is estimated by a least squares fit of the last measured centroids of the beam to a linear path through the x,y planes of interest. The intersection of the estimated path with each x,y plane of interest is then taken to be a reference point for that plane. If the last computed centroid of the beam in a plane of interest does not coincide with the reference point for that plane, the jig is assumed to be out of alignment in that plane. Use of a single laser beam to establish multiple reference lines for measuring jig alignment, in combination with use of the method of least squares fit of calculated centroids to a line to estimate the beam path, substantially reduces the effects of laser beam drift on determination of jig alignment.

It is accordingly an object of the invention to provide an improved system for monitoring alignment of a jig with high accuracy and resolution.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DRAWINGS

DETAILED DESCRIPTION

Figure 1:
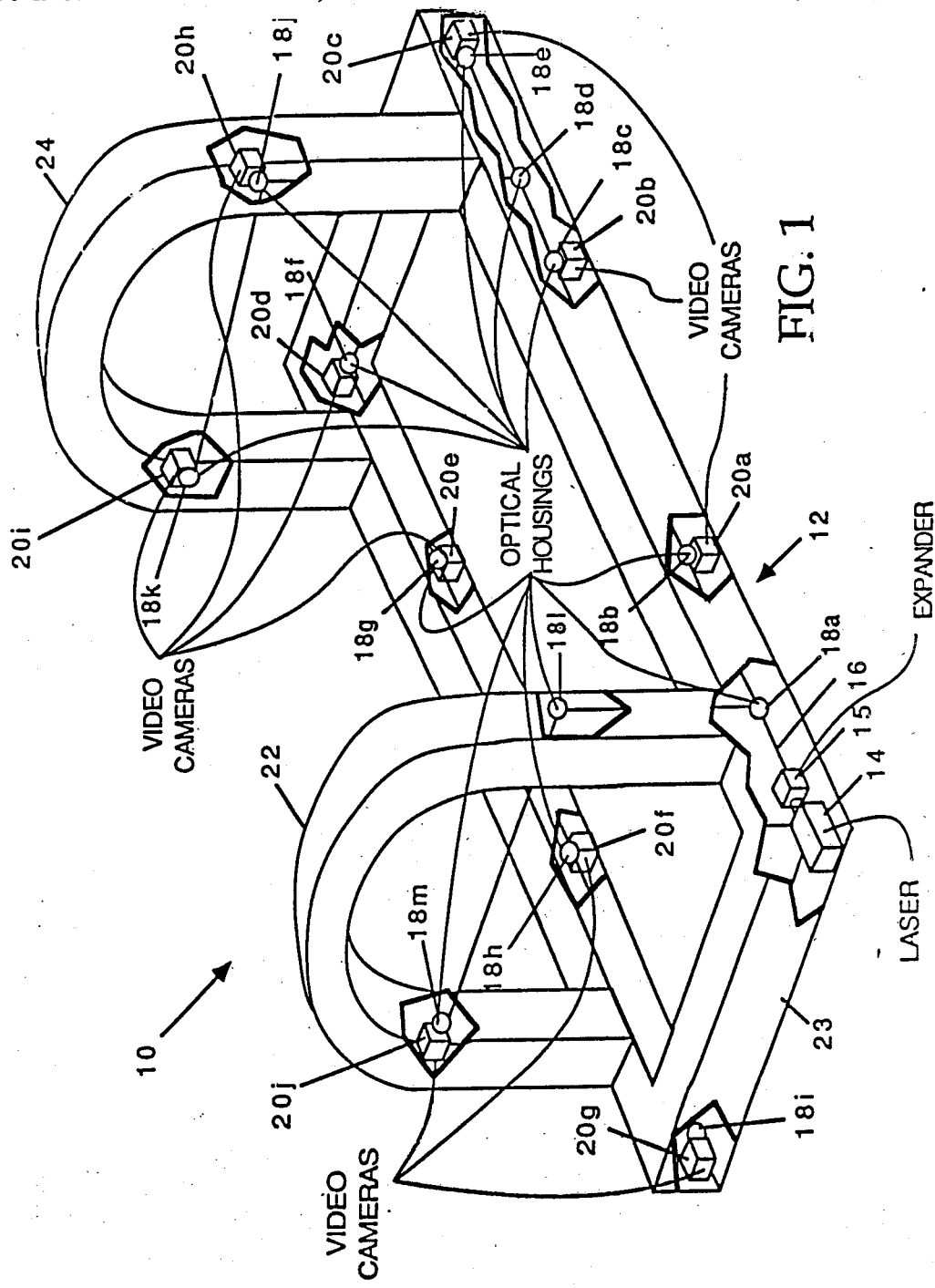
FIG. 1 is a perspective view illustrating the laser alignment system of the present invention installed on a typical jig.

With reference to FIG. 1, a laser alignment system 10 in accordance with the present invention is illustrated as installed on a jig 12 including a rectangular horizontal frame 23 and a pair of inverted U-shaped vertical members 22 and 24 attached thereto. System 10 is adapted to monitor movement of points on jig 12 relative to the path of a laser beam produced by a laser source 14 and delivered through a laser beam expander 15 and a set of optical housings 18a-18m mounted at various locations on the jig interconnected by a network of tubes 16 through which the beam travels. A beam splitter mounted in a given optical housing 18a-18m may retransmit a portion of an incoming beam without changing its direction and may reflect the remaining portion of the incoming beam in a direction perpendicular to the incoming beam. Reflected and/or retransmitted portions of the beam continue to other optical housings via tubing 16 or into one of a set of video cameras 20a-20j. The beam splitters are arranged on jig 12 so that portions of the same laser beam are directed through several planes of interest, and at each plane of interest a portion of the beam is reflected or retransmitted by a beam splitter onto a large area-array photodetector in a video camera 20a-20j attached to the respective beam splitter.

Each element of the photodetector array in a video camera produces an output voltage representing an average intensity of light striking the element during a sampling interval. Each video camera produces a video output signal comprising a sequence of photodetector element output voltages. Thus, the output signal of each video camera represents the intensity of the light detected by each photodetector of the array, and represents a two-dimensional sampling of the beam intensity distribution in the corresponding plane of interest.

Figure 2:
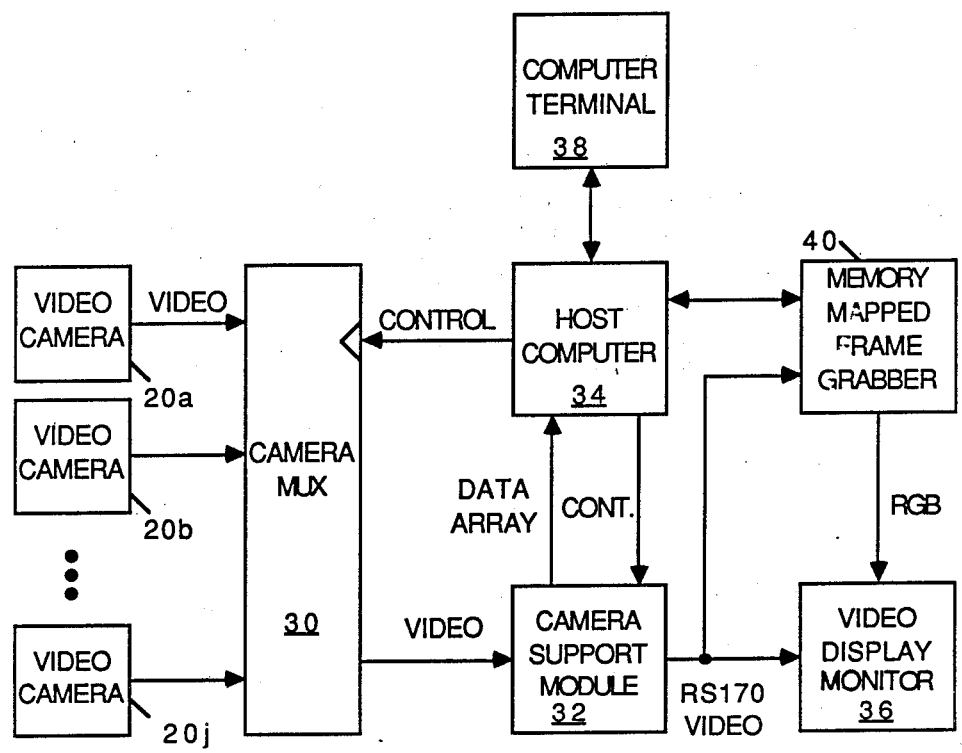
FIG. 2 is a block diagram of electronic components of the laser alignment system of the present invention.

Referring to FIG. 2, the video output signals of cameras 20a-20j are provided as inputs to a camera multiplexer 30 which passes a selected one of its input video signals to a camera support module 32, the selection being controlled by a host computer 34. Camera support module 32 includes a "frame grabber" that digitizes the input video signal to produce an array of 256×256 eight-bit data words, each word indicating the intensity of light detected by a separate one of the 256×256 photodetectors within the camera 20a-20j that produced the video signal. Thus, the data array produced by camera support module 32 also represents the light intensity distribution of the laser beam as it intersects a plane of interest on the jig. The intensity data array is transmitted to computer 34 which calculates from the intensity data array the position of the centroid of the beam with respect to a reference point on the plane of interest. Any deviation of the calculated beam centroid position from the reference point represents a change in jig shape. The methods of calculating the centroid of the beam and of determining where the reference point is located on each plane of interest are discussed in detail hereinbelow.

The video signal received by camera support module 32 is suitably converted to standard RS170 format, and the video signal is passed to a video display monitor 36 so that a monochrome image of the laser beam may be displayed. The image enables an operator to monitor the beam distribution in a particular plane on a "real-time" basis and is helpful when initially installing and orienting various components of the laser alignment system by providing visual feedback as to the centration of the beam within the confines of the photodetector array of each camera 20a-20j. An additional RS170 video frame grabber 40, memory mapped on the bus of the host computer, provides RGB (Red/Green/Blue) color conversion. The RGB color conversion circuit translates the digital value associated with each pixel into separate red, green, and blue digital values via three separate translation functions. The red, green, and blue digital values are then converted directly to analog voltages in the standard RGB format. (In an alternative embodiment of the invention, frame grabber 40 is eliminated and the RGB signal is supplied by camera support module 32.) The analog RGB output signal is fed to video display monitor 36.

Monitor 36 can accept a number of video input formats, including NTSC composite video (RS170 standard) and RGB. An operator may select the desired signal source using a switch on the monitor. When the operator selects the RGB input signal, monitor 36 displays a multi-color image of the beam intensity distribution with each color suitably indicating a different intensity of the beam. The color image is useful during system installation and calibration for adjusting the intensity of the laser beam in a manner discussed hereinbelow. User interface with a host computer 34 is provided through a computer terminal 38 which includes a keyboard for user input and a monitor for displaying messages and data.

With reference to FIGS. 1 and 2, laser source 14 suitably comprises a laser which exhibits an exit beam diameter in the range of 0.3 mm to about 0.7 mm and a beam power from 0.1 milliwatt to several milliwatts. The laser beam encounters many optical surfaces at angles of incidence near Brewster's angle, which would tend to cause an unpolarized beam to become polarized. Thus, the laser beam is polarized so as to prevent mode contention within the laser showing up as intensity variations at points along the beam path. The laser source 14 suitably comprises a Uniphase model 1308P. The laser beam expander 15 is a standard 10× beam expander manufactured by Rolyn Optics.

Computer 34 was a Stride series 400 VME bus-based computer employing a Motorola 68000 microprocessor operating at 12 MHz, 1 megabyte of internal RAM, 4 serial ports, a parallel port, and built-in local area network hardware. In addition, this computer can be configured with a Stride 68020 accelerator board with an MC68881 math co-processor for a two-fold reduction in the time required to determine the location of the laser spot centroid. (Most of the time is spent in image transmission and in digital image preprocessing.)

Each camera 20a–20j may comprise a model MC9256 video camera manufactured by EG&G Reticon Corporation, which camera has a 10×10 mm array of 256×256 photodetectors and is capable of producing a video output signal at frame rates up to 105 frames per second. The frame grabber module 32 suitably comprises a Poynting Products, Inc. Model 9000 camera support module, and multiplexer 30 is a 16-1 "Retmux" camera multiplexer also manufactured by Poynting Products Inc. for use in conjunction with EG&G Reticon model MC9256 video cameras. Frame grabber 40 may comprise a Datacube VVG-128 VME bus compatible frame grabber mounted in a card slot within computer 34. Video monitor 36 is a Panasonic model CT1400MG.

Figure 3:
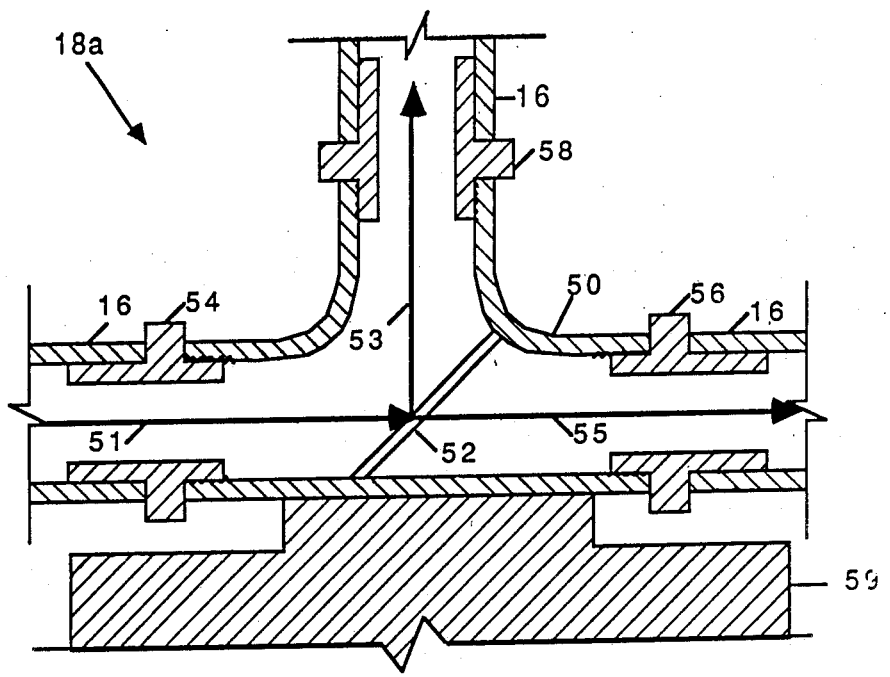
FIGS. 3 and 4 are sectional views of optical housings, showing optical components and video camera heads, suitable for use in the present invention.
Figure 4:
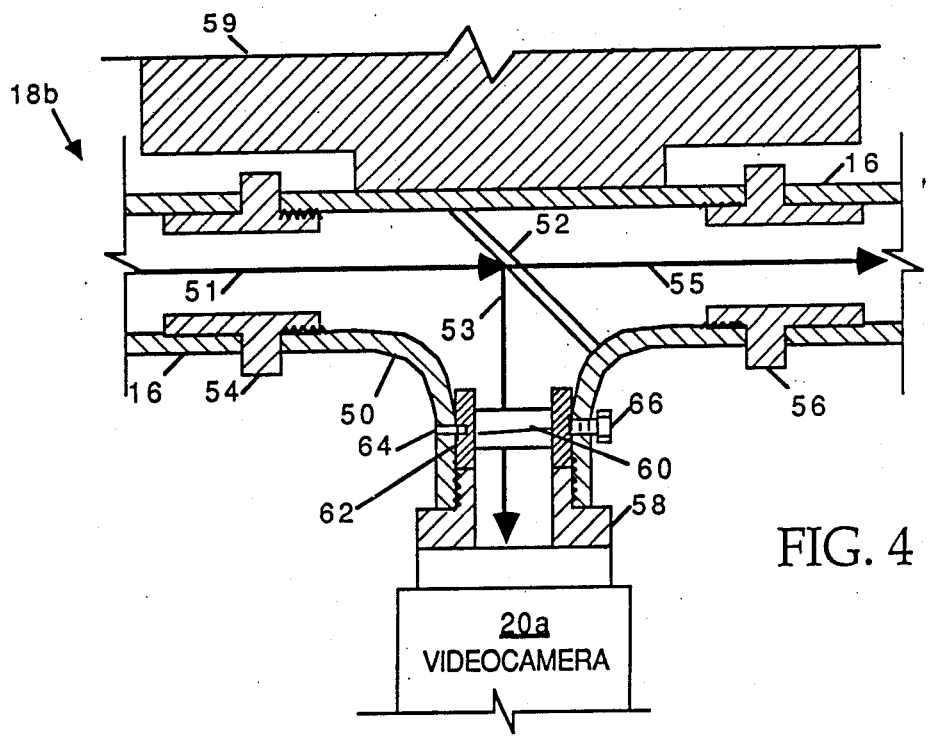

FIGS. 3 and 4 illustrate examples of optical housings used in FIG. 1, similar parts being identified by similar reference numerals. FIG. 3 shows optical housing 18a of FIG. 1 in more detail. With reference to FIG. 3, optical housing 18a comprises a tee-shaped tubular metal housing 50 and threaded connectors 54, 56, and 58, each coupling a beam tube 16 to a separate one of three legs of the housing. An incoming laser beam 51 enters the housing 50 through connector 54, and strikes optical beam splitter 52. Beam splitter 52 is oriented so as to reflect a portion 53 of beam 51 upwardly, at a right angle from the incident beam 51, and out of housing 50 through connector 58. The nonreflected portion 55 of the incoming beam 51 passes through beam splitter 52 and out of the housing 50 through connector 56.

With reference to FIG. 4, optical housing 18b also comprises a tee-shaped tubular metal housing 50 and threaded connectors 54 and 56, each coupling a beam tube 16 to a leg of the housing. A video camera 20a is shown attached to a third leg of optical housing 18b by means of threaded connector 58. Optical housing 18b also includes a polarizing filter 60 mounted in a sleeve 62 rotatable within housing 50. An operator may temporarily insert a pin (not shown) through a slot 64 in housing 50 and into a small hole in sleeve 62 and utilize the pin to rotate polarizing filter 60 about an axis defined by laser beam 51. Laser beam 51 is polarized, and polarizing filter 60 (used in an analyzer configuration) reduces the intensity of beam 51, the amount of intensity reduction being determined by the angle of rotation of the polarizing filter. Once the beam intensity has been correctly adjusted (in accordance with a method described hereinbelow), the angular position of polarizing filter 60 is fixed by a set screw 66 passing through housing 50 and engaging sleeve 62. Polarizing filter 60 is tilted about two degrees from the plane perpendicular to beam 51 such that any scattered or reflected light is directed away from the beam path so as to prevent interference with the beam.

In FIG. 4, the incoming laser beam 51 enters the housing 50 through connector 54 and strikes an optical beam splitter 52. Beam splitter 52 is oriented so as to reflect a portion 53 of beam 51 downwardly at a right angle from the incident beam 51, through polarizing filter 60 and a connector 58 into video camera 20a. The nonreflected portion 55 of the incoming beam 51 passes through optical beam splitter 52 and out of the optical housing 50 through connector 56. By rotating polarizing filter 60 in FIG. 4, an operator may adjust the intensity of the beam 53 entering camera 20a.

Other optical housings 18c–18m are generally similar to housings 18a or 18b of FIGS. 3 and 4, except that some housings serve to terminate the laser beam. The beam termination housings 18k, 18l and 18m are capped with light absorbing material. The optical housings 18a–18m and interconnecting tubes 16 are air-filled, and the interconnections between beam splitters and tubes are made relatively air tight. Enclosing the beam path helps to prevent fluctuations in air density which can alter beam direction, and eliminates scattering of the beam by dust. Enclosing the beam also prevents workers from inadvertently looking into a laser beam. Each of the optical housings 18a–18m is firmly attached to the jig through weights 59 of heavy material (see FIGS. 3 and 4). The weights 59, which may be formed of lead or uranium, are suitably of sufficient mass to absorb the energy of vibrations as may be present in a jig so that such vibrations are not substantially transmitted to the optical housings. The laser source is attached to the jig though similar heavy weight material to prevent vibration of the laser source.

Figure 5:
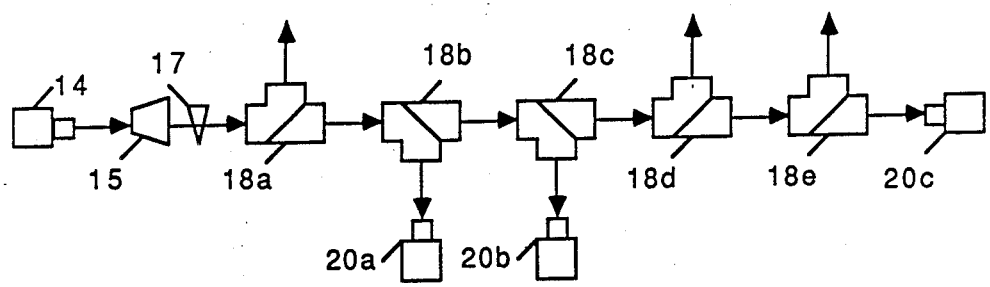
FIG. 5 is a schematic diagram of the optical components of the laser alignment system of the present invention.

FIG. 5 comprises a schematic illustration of a portion of the optical path of the laser beam of the alignment system 10 of FIG. 1. The 0.48 mm laser beam produced by laser source 14 initially passes through laser beam expander 15 which expands the beam diameter by a factor of 10 in order to reduce both the natural divergence and the beam drift, each by a factor of 10.

It is desirable to reduce the natural beam divergence so that the diameter of the laser beam will remain small enough over a path length of 200 feet to fit entirely within the confines of the 10 millimeter square area-array detectors contained within the video cameras. By adjusting the separation between laser source 14 and beam expander 15, it is possible to achieve a laser beam diameter of approximately 7 mm as the beam exits the beam expander. By adjusting the focus mechanism of beam expander 15, it is possible to position a beam waist with a diameter of approximately 5 mm at a distance of 100 feet from the beam expander. This 5 mm diameter beam will re-expand to a diameter of approximately 7 mm at a distance of 200 feet from the beam expander. Thus, the diameter of the laser beam remains smaller than 10 mm over an entire 200 foot beam path in the present embodiment.

The expanded beam output of beam expander 15 may pass through a removable optical wedge 17, i.e., a prism which deflects the beam by a small angle. During normal operation, wedge 17 is not installed in the beam path. However, during system initialization, as described in more detail hereinbelow, wedge 17 is temporarily installed in the beam path for system calibration purposes.

After leaving beam expander 15, and passing through wedge 17, if installed, the beam passes through the series of beam splitters. The beam splitter installed in optical housing 18a reflects about 10% of the incoming beam upward to another beam splitter mounted in optical housing 18l (see FIG. 1) and passes the remaining 90% of the beam on to optical housing 18b. The beam splitter inside optical housing 18b reflects about 10% of the incoming beam towards camera 20a and transmits the remaining portion of the beam to optical housing 8c. Similarly each successive beam splitter located in housings 18c–18e produces two beams, one having an intensity about 10% of the incident beam intensity, and another of about 90%. The 90% intensity beam is transmitted to another beam splitter while the 10% intensity beam may be transmitted to a video camera, or on to another beam splitter.

With reference to FIG. 1, the position of each optical housing 18a–18m to which a camera is connected is adjusted during system installation so that the 5–7 mm diameter laser beam is substantially centered on the 10×10 mm photodetector array in the camera, although the accuracy with which the beam is centered is not critical. The beam centering adjustment is made for each housing to which a camera is attached by monitoring the video output of the camera on display monitor 36 of FIG. 2. Once those optical housings with attached video cameras are properly positioned, as indicated by a centered laser spot image on the video monitor, the polarizing filter 60 of FIG. 4 within each optical housing fitted with a polarizing filter is rotated so as to adjust beam intensity directed into a video camera. Those housings with attached video cameras require a polarizer to attenuate the laser beam intensity to about 80% of photodetector saturation. This process has no effect on the intensity of the laser beam in the main beam line because the polarizer is not situated in the main beam line, but is located in the leg of the T-shaped optical housing which is directly attached to the video camera.

As an aid in adjusting the intensity of the laser beam on the photodetectors, frame grabber 40 is programmed to display white pixels for those pixels which have intensities greater than approximately 80% saturation intensity. Pixels with less than 80% saturation intensity are advantageously displayed in various shades of red, with the red intensity being proportional to the stored intensity value for the pixel.

The laser beam has a radial Gaussian intensity profile, with the most intense portion of the beam being at its center. A primary task of the laser alignment system is to determine the location of the center (i.e., the centroid) of the laser spot on the photodetector array. This is accomplished by fitting the pixel data to a two-dimensional mathematical Gaussian curve, utilizing the method of least-squares as described more fully hereinbelow. In the process of executing the least-squares fit, only those pixels whose intensities lie on the "slopes" of the Gaussian intensity profile will be used as intensity data points. The minimum and maximum acceptable pixel intensities are also displayed as white pixels, as programmed in the frame grabber 40. Thus, a correctly positioned polarizer will yield a spot on video display monitor 36 which will have no white pixels at the center, and will have two approximately equally spaced concentric white rings outlining the spot region which contains active data pixels.

Some optical housings, such as 18a (see FIG. 3) and 18d, serve only to split the incoming laser beam into two paths. These housings, which contain no polarizers or video cameras, are manually positioned by briefly removing the attached beam tubes, and adjusting the position of the housing while observing the position of the laser spot on a piece of white paper or cardboard attached to the openings of the optical housing. The beam splitters contained in these housings (e.g., 18a and 18d) serve to reroute approximately 10% of the incoming laser beam into side branches of the alignment network, while the remaining 90% of the incoming beam is passed along the main beam line.

The entire alignment procedure begins with the optical housing nearest the laser (e.g., 18a) and proceeds in a sequential manner down the main beam line. When the optical housings located along the main beam line have been positioned properly, then the housings located along side branches may be positioned.

Each camera 20a–20j monitors movement within a plane perpendicular to the path of the laser beam of a particular point on jig 12. For example, with reference to FIG. 1, camera 20a monitors the intensity of the beam in a vertical plane passing through optical housing 18b perpendicular to the beam path. If the point on frame 23 of jig 12 to which optical housing 18b is attached rises or falls with respect to the point of attachment of laser source 14, the beam will move in that plane and cause a corresponding movement of the reflected portion of beam in the plane defined by the photodetector array in camera 20a. Each camera 20a–20j monitors jig movement within a different plane in a similar manner. During system operation, the beam "position" within any plane of interest monitored by a camera 20a–20j is taken to be the weighted centroid of its intensity distribution.

The intensity of the beam at each of a set of points (x,y) in a plane of interest monitored by a video camera is represented by the data array produced by camera support module 32 of FIG. 2. In effect, this intensity data array is a digitized image of the spot of light formed on the photodetector array by the incoming laser beam. Thus, each picture element, or pixel, in the digitized image has both an intensity value, and a specific location traceable to a physical location on the photodetector array. Each photodetector accumulates a charge proportional to the average intensity of the laser beam over the area of the individual photodetector (typically 0.000016 square centimeters) over a single frame interval (typically 0.03 seconds). The digitized voltage output of each of the 256×256 photodetectors of the photodetector array is represented as a single 8-bit value within the data array, and the position of each digital intensity value within the data array corresponds to the physical position of individual photodetectors.

Since most low power commercially available HeNe lasers exhibit TEMoo output, the cross-section of the beam will exhibit a Gaussian intensity distribution within the plane monitored by the video camera. The intensity of the TEMoo output beam decreases radially in an exponential fashion. Thus, in accordance with the invention, the centroid (h,k) of the beam is determined by host computer 34 from the data array using the method of least squares to fit the observed beam intensity distribution to a two-dimensional Gaussian curve. A two-dimensional Gaussian intensity distribution $I(x,y)$ in an x,y plane may be modeled as follows:

$$I(x,y) = I_o \exp{-2\{[(x-h)^2 + (y-k)^2]/r^2\}} \quad [1]$$

where $I_o = 2P/\pi r^2$, P is the total power of the beam, h and k are the x and y coordinates of the centroid of the beam in the x,y plane of interest, and r is the distance from the centroid of the beam at which $I = I_o e^{-2}$. In the application of the method of least-squares to obtain a fit to equation [1], we must first obtain a form for equation [1] which is linear in the unknown coefficients $I_o$, r, h, and k. This is accomplished by simply taking the natural log of both sides of the equation, to yield $$LnI(x,y) = (-2/r^2)(x^2+y^2) + (4h/r^2)x + (4k/r^2)y + Ln(I_o) + (-2/r^2)(h^2+k^2) \quad [2a]$$

We define chi-squared ($X^2$) as equal to the weighted sum of the squares of the deviations of the observed data points from the Gaussian fitting function whose coefficients $I_o$, r, h, and k are presently unknown. Chi-squared is defined by the following relation:

$$X^2 = (1/\sigma) \sum_{(x,y)} \{[LnI(x,y) - (-2/r^2)(x^2+y^2) - (4h/r^2)x - (4k/r^2)y - Ln(I_o) - (-2/r^2)(h^2+k^2)]\} \quad [2b]$$

where $\sigma$ is a constant. By minimizing chi-squared, we will have found the most probable values for the four coefficients $I_o$, r, h, and k. We are required to minimize chi-squared with respect to all four coefficients simultaneously and may accomplish this by taking the partial derivative of chi-squared with respect to each of the unknown coefficients, and set the partial derivative to zero, to yield the following four so-called "normal" equations, which comprise the required set of four equations in four unknowns. These are:

$$\sum_{(x,y)} (lnI(x,y))(x^2+y^2) = \quad [3]$$

$$(-2/r^2) \sum_{(x,y)} (x^2+y^2)(x^2+y^2) +$$

$$(4h/r^2) \sum_{(x,y)} (x)(x^2+y^2) +$$

$$(4k/r^2) \sum_{(x,y)} (y)(x^2+y^2) +$$

$$[\ln(I_o) + (-2/r^2)(h^2+k^2)] \sum_{(x,y)} (x^2+y^2)$$

$$\sum_{(x,y)} (lnI(x,y))(x) = (-2/r^2) \sum_{(x,y)} (x^2+y^2)(x) + \quad [4]$$

$$(4h/r^2) \sum_{(x,y)} (x)(x) + (4k/r^2) \sum_{(x,y)} (y)(x) +$$

$$[\ln(I_o) + (-2/r^2)(h^2+k^2)] \sum_{(x,y)} (x)$$

$$\sum_{(x,y)} (lnI(x,y))(y) = (-2/r^2) \sum_{(x,y)} (x^2+y^2)(y) + \quad [5]$$

$$(4h/r^2) \sum_{(x,y)} (x)(y) + (4k/r^2) \sum_{(x,y)} (y)(y) +$$

$$[\ln(I_o) + (-2/r^2)(h^2+k^2)] \sum_{(x,y)} (y)$$

-continued $$\sum_{(x,y)} (lnI(x,y)) = (-2/r^2) \sum_{(x,y)} (x^2+y^2) + (4h/r^2) \sum_{(x,y)} (x) + \quad [6]$$

$$(4k/r^2) \sum_{(x,y)} (y) +$$

$$[\ln(I_o) + (-2/r^2)(h^2+k^2)] \sum_{(x,y)} 1$$

Equations [3]–[6] may be rewritten as:

$$Aw_1 + Bx_1 + Cy_1 + Dz_1 = V_1 \quad [7]$$

$$Aw_2 + Bx_2 + Cy_2 + Dz_2 = V_2 \quad [8]$$

$$Aw_3 + Bx_3 + Cy_3 + Dz_3 = V_3 \quad [9]$$

$$Aw_4 + Bx_4 + Cy_4 + Dz_4 = V_4 \quad [10]$$

where $$A = -2/r^2 \quad [11]$$

$$B = 4h/r^2 \quad [12]$$

$$C = 4k/r^2 \quad [13]$$

$$D = \ln(I_o) + (-2/r^2)(h^2+k^2) \quad [14]$$

$$w_1 = \sum_{(x,y)} (x^2+y^2)(x^2+y^2) \quad [15a]$$

$$w_2 = \sum_{(x,y)} x(x^2+y^2) \quad [15b]$$

$$w_3 = \sum_{(x,y)} y(x^2+y^2) \quad [15c]$$

$$w_4 = \sum_{(x,y)} (x^2+y^2) \quad [15d]$$

$$x_1 = \sum_{(x,y)} x(x^2+y^2) \quad [16a]$$

$$x_2 = \sum_{(x,y)} x^2 \quad [16b]$$

$$x_3 = \sum_{(x,y)} xy \quad [16c]$$

$$x_4 = \sum_{(x,y)} x \quad [16d]$$

$$y_1 = \sum_{(x,y)} y(x^2+y^2) \quad [17a]$$

$$y_2 = \sum_{(x,y)} xy \quad [17b]$$

$$y_3 = \sum_{(x,y)} y^2 \quad [17c]$$

$$y_4 = \sum_{(x,y)} y \quad [17d]$$

$$z_1 = \sum_{(x,y)} (x^2+y^2) \quad [18a]$$

$$z_2 = \sum_{(x,y)} x \quad [18b]$$

$$z_3 = \sum_{(x,y)} y \quad [18c]$$

$$z4 = \sum_{(x,y)} 1 \qquad [18d]$$

$$v1 = \sum_{(x,y)} (\ln I(x,y))(x^2 + y^2) \qquad [19a]$$

$$v2 = \sum_{(x,y)} (\ln I(x,y))x \qquad [19b]$$

$$v3 = \sum_{(x,y)} (\ln I(x,y))y \qquad [19c]$$

$$v4 = \sum_{(x,y)} (\ln I(x,y)) \qquad [19d]$$

The values for the various summations (some are identical) indicated in equations [15a]–[19d] are computed based on the stored pixel data. There after the values of unknown parameters A–D are computed from equations 7–10, using any of several well-known methods for solving four equations in four unknowns. Once the value of A–D are known, the value of r can be determined from equation [11] rearranged as follows:

$$r = (-2/A)^{\frac{1}{2}}. \qquad [20]$$

Given the value of r, the values of h and k can be determined from equations 12 and 13 rearranged as follows:

$$h = r^2 B/4 \qquad [21]$$

and $$k = r^2 C/4. \qquad [22]$$

The centroid (h,k) of the beam as it crosses each plane of interest monitored by a video camera is thus determined using the method of least squares fit to a Gaussian distribution. However, a change in position of the centroid of the beam in a particular plane of interest does not necessarily indicate a change in jig shape because a change in direction of the laser beam can also cause a change in the position of the centroid. The laser beam direction can change ("drift") somewhat due to temperature changes in the laser source 14 or due to bending, compression or rotation of the area of the jig where the laser source is mounted. In order to determine whether movement of the beam centroid in a particular plane was caused by a change in jig shape or by beam drift, a "floating" reference point is established in the plane from which any deviation of the beam centroid indicates a change in jig shape. The reference point "floats" (changes) with the direction of the beam, and as long as the calculated beam centroid coincides with the floating reference point, the jig is considered to be properly aligned within the plane.

Figure 6:
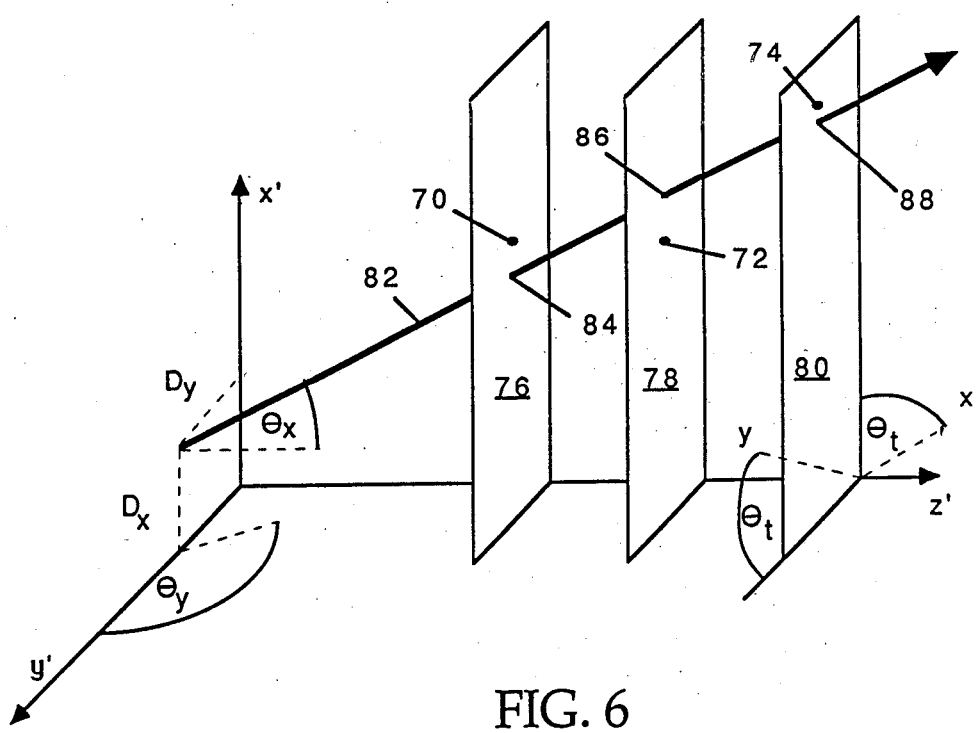
FIG. 6 is a diagram illustrating parameters used in estimating a laser beam path through a set of parallel planes in accordance with the present invention.

With reference to FIGS. 5 and 6, the laser beam path is a straight line from laser source 14 to camera 20c. If the jig shape remained unchanged, an angular displacement of the beam relative to the jig would result in displacements in the coordinates of the centroids of the beam in the x,y planes 76, 78 and 80 monitored by the video cameras 20a–20c, respectively. The amount of these centroid displacements would be proportional to the respective distances of planes 76, 78 and 80 from laser source 14. On system initialization, when the jig is properly aligned, a three-dimensional (x',y',z') right-handed coordinate system, designated "beam line" coordinates, is established. The z' axis of the beam line coordinate system coincides with the initial direction of the beam from laser source 14, and the x' and y' axes are mutually perpendicular to each other and to the z' axis, as depicted in FIG. 6. In general, the photodetector arrays on a particular jig will have no particular co-linear or co-planar arrangement with respect to each other, but will be placed in a three-dimensional configuration which appears to be best suited to monitor the shape of the jig. However, in beam line coordinates, all photodetector surfaces are viewed as being arranged in co-linear fashion along the z' axis, with the detector surfaces being perpendicular to the z' axis. "Local" x and y axes are established for the two-dimensional photodetector array in each camera which axes x,y will have some rotational orientation with respect to the beam line x' and y' axes. The rotational orientation and the "handedness" of each photodetector array must be described with respect to beam line coordinates. Local coordinates may be right or left handed due to the fact that an odd or even number of beam splitters may have been encountered by the beam before the beam is intercepted by a particular video camera.

Both the handedness and rotational orientation of each photodetector array are conveniently described in terms of a single rotation matrix. The elements of the rotation matrix, suitably arranged for the particular direction of transformation, are simply the dot products i·i', i·j', j·i', and j·j', where i, j, i', and j' are unit vectors defined in the beam line coordinate system, along the local x and y axes and along the beam line x' and y' axes, respectively. Thus, for transforming from detector coordinates to beam line coordinates, the following matrix multiplication may be used:

$$\begin{bmatrix} x' \\ y' \end{bmatrix} = \begin{bmatrix} i' \cdot i & i' \cdot j \\ j' \cdot i & j' \cdot j \end{bmatrix} \begin{bmatrix} x \\ y \end{bmatrix} \qquad [23]$$

where the primed quantities refer to beam line coordinates, and the unprimed quantities refer to the local coordinate system attached to the photodetector array. Equation [23] assumes, that the local z axis is coincident with the z¹ axis.

Beam line coordinates are mathematically useful in the interim steps involved in determining the alignment status of the jig. When the alignment status in beam line coordinates has been determined for each detector location, an additional three-dimensional coordinate transformation is used to convert to true jig coordinates.

When the system is initialized, detector position, orientation and handedness information is supplied in terms of beam line coordinates. Since the position and orientation will generally be known only in approximate terms, a start up procedure is performed to refine this information for each photodetector. This procedure assumes that the rotational orientation errors (assumed versus actual) for the photodetector arrays are small and average out to near zero. If the average orientation of the axes of symmetry of the photodetector arrays does not coincide with the major symmetry axes of the jig, then there will be a systematic error between beam line coordinates and the true jig coordinates. It is expected that this systematic offset will always exist to some extent. The influence of the systematic error on the computed jig alignment values will be in proportion to the magnitude of the systematic error, which is expected to be quite small.

The first step in the start-up procedure is to compute the centroid location of the beam on each photodetector array. This establishes the direction of the beam line $z'$ axis. In addition, the coordinates (h,k) of the beam centroid on each photodetector array defines the origin of each local (x,y) coordinate system. Future centroid readings will be compared to this local origin position to ascertain relative motion between the beam and the jig. The location of the origin of the local (x,y) coordinate system, as established by the initial centroid position, will generally not coincide with the physical center of the photodetector array. This is due to the slight mechanical inaccuracies inherent in the process of attaching the optical housings to the jig.

Before equation [23] may be used to transform local coordinates into beam line coordinates, it is first necessary to translate detector physical coordinates into detector local coordinates. Detector physical coordinates are centered at the physical center of the photodetector array, while detector local coordinates are centered at the point of intersection of the $z'$ axis with the surface of the photodetector, as indicated above. The required coordinate translation is accomplished by means of the following translation equations:

$$x = x1 - x0 \quad [24]$$

$$y = y1 - y0 \quad [25]$$

where x and y are the coordinates of a point P(x,y) expressed in (translated) local coordinates, x1 and y1 are the physical coordinates of point P, and x0 and y0 are the physical coordinates of the origin of the local coordinate system.

The second step in refining the camera position and orientation utilizes the insertion of an optical wedge in the beam at a point near the laser. This wedge causes the beam to be deflected through a small angle. The centroid motion induced on each photodetector surface by the insertion of the optical wedge is mathematically described as a displacement vector. The magnitude of the centroid displacement vector is proportional to the distance between the wedge and the individual photodetector surface. The magnitude of the centroid displacement vector can thus be used to refine the relative distances between the laser and the individual photodetectors along the $z'$ axis.

The angle subtended by the centroid displacement vector and the local x or y axis of each photodetector array is used to refine the angular orientation of the photodetector array with respect to the beam line $x'$ and $y'$ axes. If all photodetector arrays were described perfectly in terms of their relative orientation with respect to beam line coordinates, then, after transforming to beam line coordinates, the angular orientation of the centroid displacement vectors for all photodetector arrays would be identical. They generally will not be identical, as mentioned above, due to the inaccuracies involved in mounting the optical housings on the jig. However, it is likely that the sum of the orientation errors will tend to zero over a large enough collection of detectors. This premise is taken advantage of in the following way in order to refine the orientation of each individual detector array. First, the average orientation for the centroid displacement vectors, expressed in beam line coordinates, is found. The difference between the average orientation value and the value for a particular photodetector array is then computed and used to modify the orientation value for that particular photodetector array. Upon completion of this start-up procedure, the angular orientation of each local (x,y) coordinate system will have been refined in a manner such that the orientation of the centroid displacement vectors for all photodetector arrays will be identical when transformed into beam line coordinates.

When the beam line coordinate system has been established, and the position and orientation of the photodetector arrays refined, it becomes possible to separate the effect of laser beam drift from actual jig distortions. First, equations [24] and [25] are used to translate centroid physical coordinates into centroid local coordinates for each photodetector array on the jig. Then, equation [23] is used to rotate centroid local coordinates (h,k) into centroid beam line coordinates (h',k'). With the centroid locations available in beam line coordinates it is possible to estimate the straight line path 82 (see FIG. 6) of the beam, after the beam has drifted from its initial coincidence with the $z'$ axis, by means of a least-squares fit of the centroid deflection data to a straight line. If jig distortions were absent, the centroid deflections would lie along a straight line when plotted as a function of $z'$. To the extent that the jig does distort, the individual centroid deflections will depart from a straight line relationship, as illustrated by points 70, 72, and 74 in FIG. 6. Inasmuch as active beam control is not exerted on the laser beam, it is of course impossible to know whether the laser beam drifted or whether the jig moved rigidly with respect to the laser beam. However the distinction is of little concern, since it is immaterial whether or not the jig remained in a fixed orientation with respect to an arbitrary external coordinate system (e.g., gravity horizontal) as long as the jig retained its required shape.

With reference to FIG. 6, the least-squares fit to a line estimates the path 82 of the beam in terms of angles $\theta_x$ and $\theta_y$ of deflection from the $z'$ axis in the $x',z'$ and $y',z'$ planes, respectively, and in terms of its displacements $D_x$ and $D_y$ from the $z'$ axis along the $x'$ and $y'$ axes, respectively. Given that a set of n cameras (numbered 1 to n) monitor x,y planes at optical distances $z'_1, z'_2 \ldots, z'_n$, respectively from the laser source, and that the centroids (h',k') of the beam in the planes monitored by cameras 1-n are $(h'_1, k'_1), (h'_2, k'_2), \ldots (h'_n, k'_n)$, respectively, we want to find the values of $\theta_x$ and $\theta_y$ that minimize the expression:

$$\sum_{i=1}^{n} (h'_i - z'_i \sin\theta_x - D_x)^2 + (k'_i - z'_i \sin\theta_y - D_y)^2. \quad [26]$$

Taking the derivative of the [26] expression with respect to $\sin\theta_x$, $D_x$, $\sin\theta_y$, and $D_y$, and equating the results to zero:

$$\sum_{i=1}^{n} [(h'_i - z'_i \sin\theta_x - D_x) z'_i] = 0 \quad [27]$$

$$\sum_{i=1}^{n} (h'_i - z'_i \sin\theta_x - D_x) = 0 \quad [28]$$

$$\sum_{i=1}^{n} [(k'_i - z'_i \sin\theta_y - D_y) z'_i] = 0 \quad [29]$$

-continued $$\sum_{i=1}^{n} (k'_i - z'_i \sin\theta_y - D_y) = 0 \quad [30]$$

Solving equations [27]–[30] for unknowns $\sin\theta_x$, $D_x$, $\sin\theta_y$ and $D_y$ yields $$\sin\theta_x = \frac{\sum_{i=1}^{n} z'_i \sum_{i=1}^{n} h'_i - \sum_{i=1}^{n} 1 \sum_{i=1}^{n} h'_i z'_i}{\left(\sum_{i=1}^{n} z'_i\right)^2 - \sum_{i=1}^{n} 1 \sum_{i=1}^{n} (z'_i)^2} \quad [31]$$

$$D_x = \frac{\sum_{i=1}^{n} h'_i z'_i \sum_{i=1}^{n} z'_i - \sum_{i=1}^{n} (z'_i)^2 \sum_{i=1}^{n} h'_i}{\left(\sum_{i=1}^{n} z'_i\right)^2 - \sum_{i=1}^{n} 1 \sum_{i=1}^{n} (z'_i)^2} \quad [32]$$

$$\sin\theta_y = \frac{\sum_{i=1}^{n} z'_i \sum_{i=1}^{n} k'_i - \sum_{i=1}^{n} 1 \sum_{i=1}^{n} k'_i z'_i}{\left(\sum_{i=1}^{n} z'_i\right)^2 - \sum_{i=1}^{n} 1 \sum_{i=1}^{n} (z'_i)^2} \quad [33]$$

$$D_y = \frac{\sum_{i=1}^{n} k'_i z'_i \sum_{i=1}^{n} z'_i - \sum_{i=1}^{n} (z'_i)^2 \sum_{i=1}^{n} k'_i}{\left(\sum_{i=1}^{n} z'_i\right)^2 - \sum_{i=1}^{n} 1 \sum_{i=1}^{n} (z'_i)^2} \quad [34]$$

Once $\sin\theta_x$, $D_x$ $\sin\theta_y$, and $D_y$ have been determined from the computed centroids ($h_i,k_i$) in accordance with equations [31]–[34], a reference point ($a_i,b_i$) for each plane of interest at any distance $Z'_i$ from the laser source can be determined from $$a_i = Z'_i \sin(\theta_x) + D_x \quad [35]$$

$$b_i = Z'_i \sin(\theta_y) + D_y \quad [36]$$

Any displacement of the computed, translated centroid ($h'_i,k'_i$) from the reference point ($a_i,b_i$) indicates that movement of the jig in that plane has occurred. For the alignment system 10 installed on jig 12 of FIG. 1, the path of the beam is suitably estimated from the computed beam centroids in the planes monitored by cameras 20a–20c, which are all aligned along a common beam. The value of $a_i$ and $b_i$ for other planes of interest can be determined from equations [35]–[36] when the position $Z'_i$ of the plane along the $Z'$ axis is known. The alignment errors $E_{xi}$ and $E_{yi}$ of the jig in the $x'$ and $y'$ directions in any plane of interest is thus determined by the equations:

$$E_{xi} = h'_i - a_i \quad [37]$$

and $$E_{yi} = k'_i - b_{xi}. \quad [38]$$

Figure 7:
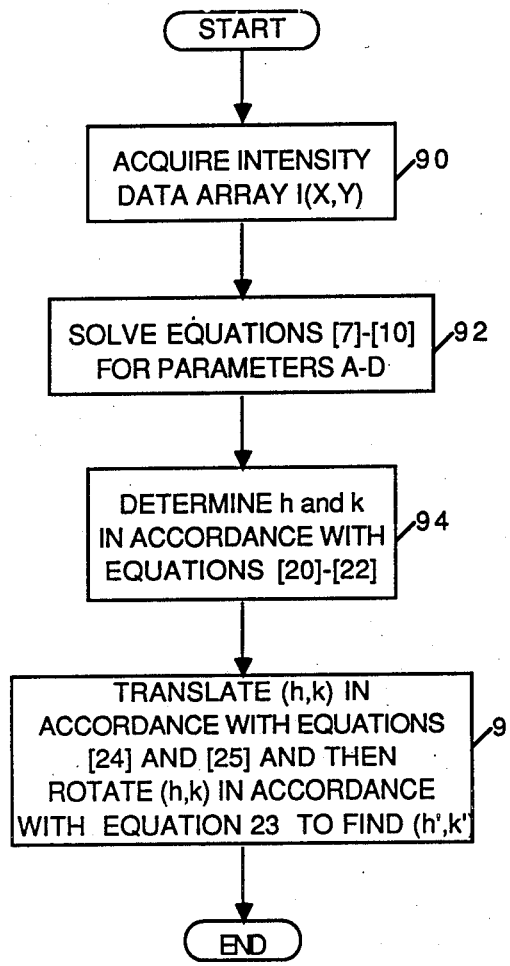
FIGS. 7-9 are flow charts for programming the computer of FIG. 2 to carry out computations in accordance with the present invention.

FIG. 7 is a flow chart for programming computer 34 of FIG. 2 to determine the centroid (h',y') of a beam in a plane monitored by a selected video camera. Initially (step 90) computer 34 acquires the intensity data array by switching camera multiplexer 30 to pass the video signal output of the selected video camera to camera support module 32, and obtaining the intensity data array produced by module 32 in response to the incoming video signal. Thereafter (step 92) computer 34 solves equations [7]–[10] hereinabove for the values of parameters A–D, given the intensity data I(x,y) obtained in step 90. The centroid (h,k) of the beam (within the local x,y coordinate system of the plane), is then determined in accordance with equations [20]–[22] hereinabove (step 94), and the local (h,k) coordinates of the centroid are then translated in accordance with equations [24] and [25] and rotated in accordance with equation [23] to provide (h',k') coordinates referenced to the beam line coordinate system (step 96).

Figure 8:
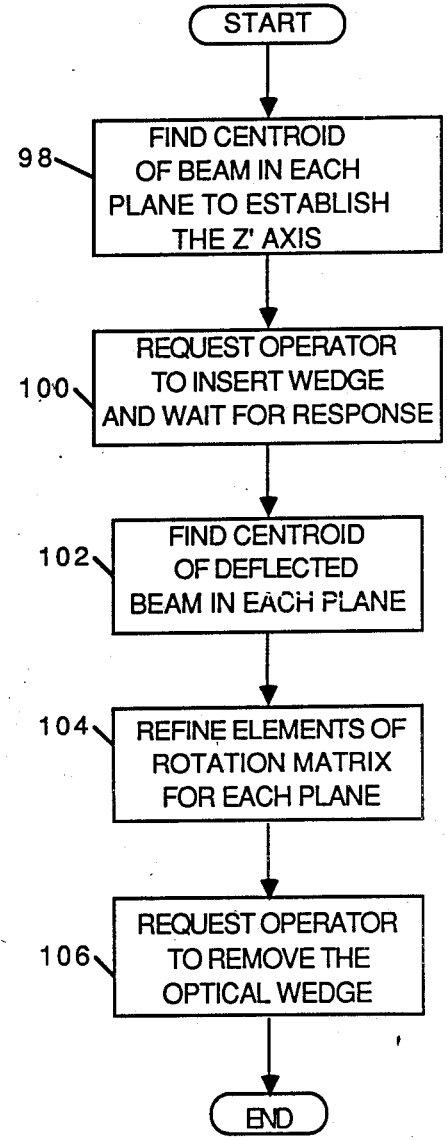

FIG. 8 is a flow chart for programming computer 34 of FIG. 2 to define the origin of the local coordinates (x0,y0) referenced in equations [24] and [25] for each plane, and to refine the elements of the rotation matrix referenced in equation [23] for each plane monitored by a selected video camera during system initialization. Starting with step 98, computer 34 finds the centroid (h,k) of the beam as it passes through each plane using a method similar to steps 90–94 of FIG. 7, thereby establishing the intersection (x0,y0) of the $z'$ coordinate with each plane of interest. Thereafter (step 100), computer 34 suitably displays a message on terminal 38 requesting the operator to insert the optical wedge in the path of the beam so that the beam is deflected, and to depress a key on terminal 38 after the wedge is inserted. After the wedge is inserted, the centroid (h,k)=(A,B) of the deflected beam in each plane is determined (step 102), again following a procedure similar to steps 90–94 of FIG. 7. The elements of the rotation matrix referenced in equation [23] are then refined (step 104). Computer 34 suitably displays a request for the operator to remove the optical wedge from the beam path (step 106).

Figure 9:
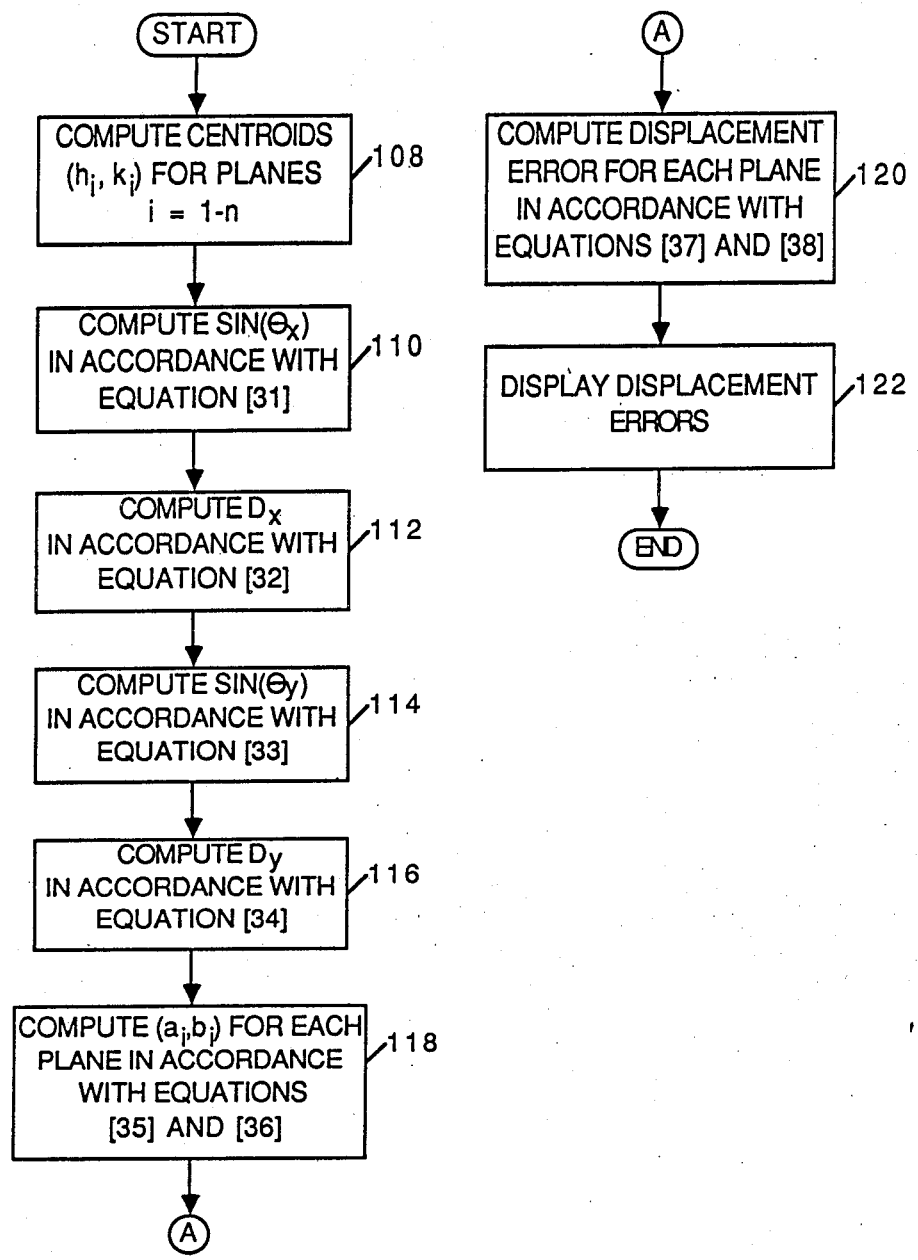

FIG. 9 is a flow chart for programming computer 34 of FIG. 2 to determine and display the displacement errors of the jig along any plane of interest monitored by a video camera. The centroids ($h_i,k_i$) for a set of n planes are determined (step 108) following a method similar to that of FIG. 7. The values of $\sin(\theta_x)$, $D_x$, $\sin(\theta_y)$, and $D_y$ are then determined from the centroids in accordance with equations [31]–[34], respectively, (steps 110–116), and a reference point ($a_i,b_i$) for each plane of interest is computed from these parameters utilizing equations [35] and [36] (step 118). The displacement errors $E_{xi}$ and $E_{yi}$ are computed in accordance with equations [37] and [38] (step 120) and displayed on terminal 38 (step 122).

A method and apparatus for monitoring changes in shape of a structure has been described in which a laser beam is directed onto photodetector arrays in video cameras mounted on the structure. The centroid of the beam as it strikes each photodetector array is determined by the method of least squares fit of the intensity distribution represented by the camera output to a Gaussian distribution. The estimated path of the beam is determined by a method of least squares fit of the computed beam centroids to a line. Any displacement of a beam centroid from the estimated beam path represents a change in jig shape.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for monitoring change in shape of a structure comprising:

light source means for generating a light beam, said light source means being rigidly attached to said structure;

photodetecting means rigidly attached to said structure and positioned such that said light beam is directed onto said photodetecting means, said photodetecting means producing data representing a light intensity distribution of said light beam directed onto said photodetecting means; and means receiving the data for calculating values of parameters of a function modeling beam intensity distribution of the light beam, such that the calculated parameter values optimize a fit with respect to predetermined criteria of the intensity distribution modeled by the function to the intensity distribution represented by the data, wherein at least one of the parameters represents a position of said light beam on said photodetector, and for ascertaining change in shape of the structure by comparing a position of the beam defined by a calculated value of said at least one parameter to a reference position.

2. The apparatus in accordance with claim 1 wherein said photodetecting means comprises a video camera.

3. The apparatus in accordance with claim 1 wherein said light source means comprises a laser.

4. An apparatus for monitoring change in shape of a structure comprising:

light source means for generating a light beam, said light source means being rigidly attached to said structure;

a plurality of photodetecting means, each comprising a photodetector array rigidly attached to said structure at locations spaced apart thereon;

a plurality of beam splitters attached to said structure and positioned to direct portions of said light beam along separate paths relative to said structure onto photodetector arrays of separate ones of said photodetecting means, said paths respectively representing relative orientation between parts of said structure intended to have fixed relationship, said photodetecting means producing data representing a light intensity distributing of the portions of said light beam directed onto said photodetector arrays; and processing means receiving the data produced by said photodetecting means for calculating values of parameters of a function modeling beam intensity distribution of the light beam, such that the calculating parameter values optimize a fit with respect to predetermined criteria of the intensity distribution modeled by the function to the intensity distribution represented by the data produced by said photodetecting means, wherein at least one of the parameters represents a position of said light beam on the photodetecting means, for determining a reference position of said light beam on at least one of said photodetecting means in accordance with the calculated parameters, and for ascertaining change in shape of the structure by comparing a position of the beam defined by a calculated value of at least one of said parameters to said reference position.

5. The apparatus in accordance with claim 4 wherein at least one of said plurality of photodetecting means comprises a video camera.

6. The apparatus in accordance with claim 4 wherein said light source means comprises a laser.

7. The apparatus in accordance with claim 4 further comprising a plurality of pipes for conveying therein said light beam from said light source to ones of said beam splitters and for conveying positions of said light beam between ones of said beam splitters and said photodetecting means.

8. An apparatus for monitoring change in shape of a structure comprising:

a light source means for generating a light beam, said light source means being rigidly attached to said structure;

a plurality of photodetecting means, each comprising a photodetector array rigidly attached to said structure at locations spaced apart thereon;

a plurality of beam splitters attached to said structure and positioned to direct portions of said light beam along separate paths relative to said structure onto photodetector arrays of separate ones of said photodetecting means, said paths respectively representing relative orientation between parts of said structure intended to have fixed relationship, said photodetecting means producing data representing a light intensity distribution of the portions of said light beam directed onto said photodetector arrays;

output means for determining from said data the movement of photodetector arrays of ones of said photodetecting means with respect to said light beam for thereby ascertaining the relative movement between parts of said structure; and at least one weight attached to at least one of said beam splitters, said weight having a mass sufficient to prove it substantial movement of said at least one beam splitter in response to vibration of said structure.

9. A method for monitoring change in shape of a structure comprising the steps of:

generating a light beam at a fixed position on said structure;

intercepting said light beam at a multiplicity of points in fixed array relation to a second position on said structure;

producing analog data at said multiplicity of points representing a light intensity distribution of said light beam;

digitizing said analog data to produce digitized data representing said light intensity distribution;

storing the digitized data;

calculating values of parameters of a function modeling beam intensity distribution of the light beam, such that the calculated parameter values provide a best fit with respect to predetermined criteria of the intensity distribution modeled by the function to the intensity distribution represented by the stored digitized data, wherein at least one of the parameters represents a position of said light beam on said photodetector; and ascertaining change in shape of the structure by comparing a position of the beam defined by a calculated value of said at least one parameter to a reference position.

10. The method in accordance with claim 9 wherein said light beam is a laser beam.

11. A method for monitoring change in shape of a tool structure comprising the steps of:

generating a light beam in fixed relationship to a first location on said structure;

splitting said light beam into separate portions and directing said portions of said light beam along separate paths relative to said structure toward a plurality of second locations on said structure;

intercepting said separate portions of said light beam at said second locations, each portion being intercepted at a separate multiplicity of points in fixed array toward which a said light beam portion is directed;

producing signal data at each said multiplicity of points representing a light intensity distribution of a light beam portion at a said second location;

calculating values of parameters of a function modeling beam intensity distribution of the light beam, such that the calculated parameter values provide a best fit with respect to predetermined criteria of the intensity distribution modeled by the function to the intensity distribution represented by the stored digitized data, wherein at least one of the parameters represents a position of said light beam on said photodetector; and ascertaining change in shape of the structure by comparing a position of the beam defined by a calculated value of said at least one parameter to a reference position.

12. An apparatus for monitoring change in shape of a structure comprising:

photodetecting means comprising a planar surface attached to said structure, said surface having orthogonal x and y axes and producing an output signal representing an intensity of light I(x,y) at each of a plurality of points at coordinates (x,y) on said surface referenced to the x,y axes of said surface;

light source means for generating a light beam, said light source means being rigidly attached to said structure with said light beam directed onto said surface, said light beam having an intensity distribution on said surface substantially in accordance with an intensity distribution function $I_i(x,y)$ having as variables coordinates x and y of points on said surface and having as constants the radius r at which intensity distribution function I'(x,y) has diminished by a predetermined factor from a point (h,k) of peak light intensity $I_o$ on said surface; and means for determining from said output signal said intensity of light I(x,y) at a plurality of points (x,y), and determining a combination of values of $I_o$, r, h, and k which substantially minimizes a weighted sum of squares of the light intensity I(x,y) represented by said output signal less a computed value of said intensity distribution function I'(x,y) for said plurality of points (x,y) and for monitoring change in shape of said structure by monitoring deviation of determined values of h and k from reference values.

13. The apparatus in accordance with claim 12 wherein said intensity distribution function is $$I'(x,y)=I_o exp\{-2[(x-h)^2+(y-k)^2]/r^2\}$$

where $I_o$ is said peak intensity and r is a distance from said point of peak intensity at which $I'(x,y)=I_o e^{-2}$.

14. The apparatus in accordance with claim 12 wherein said surface of said photodetecting means comprises an array of photodetectors, each photodetector controlling a magnitude of a separate portion of said photodetector means output signal in accordance with an intensity of light striking a said photodetector.

15. The apparatus in accordance with claim 12 wherein said light beam is a laser beam.

16. The apparatus in accordance with claim 12 wherein said structure is subject to vibration and wherein said apparatus further comprises a weight attached to said photodetecting means of mass sufficient to prevent substantial movement of said photodetecting means in response to the vibration of said structure.

17. An apparatus for monitoring change in shape of a structure comprising:

light source means rigidly attached to said structure for generating a light beam;

a plurality of photodetecting means rigidly attached to said structure, each comprising a planar surface having orthogonal x and y axes and producing an output signal representing an intensity of light I(x,y) at each of a plurality of points at coordinates (x,y) on said surface referenced to the x,y axes of said surface;

beam splitting means rigidly attached to said structure for directing portions of said light beam onto separate ones of said surfaces, each portion of said light beam having an intensity distribution on the surface onto which it is directed substantially in accordance which an intensity distribution function I'(x,y) having as variables coordinates x and y of points on the corresponding surface and having as constants the radius r at which intensity distribution function I'(x,y) has diminished by a predetermined factor from a point (h,k) of peak light intensity $I_o$ on said surface; and means for determining from the output signal produced by each of said photodetecting means the intensity of light I(x,y) at said plurality of points (x,y) on the surface of said each photodetecting means, for determining for each surface a combination of values of $I_o$ and r and of said coordinates h and k which substantially minimizes a weighted sum of squares of the light intensity 1(x,y) represented by said output signal less a computed value of said intensity distribution function for a plurality of points (x,y) of said surface, for determining from said combination of values of coordinates h and k for a plurality of said surfaces parameters defining an estimated path of said light beam, for determining from said parameters the coordinates of a reference point on each of said surfaces, and for monitoring a change in shape of said structure by comparing the determined coordinates of said reference point of each surface to the determined h and k coordinates for said each surface.

18. The apparatus in accordance with claim 17 wherein said intensity distribution function is $$I'(x,y)=I_o exp\{-2[(x-h)^2+(y-k)^2]/r^2\}$$

where $I_o$ is the value of said peak intensity and r is a distance from said point of peak intensity at which $I'(x,y)=I_o e^{-2}$.

19. A method for monitoring change in shape of a structure comprising the steps of:

attaching to said structure light source means for generating a light beam;

attaching to said structure a plurality of photodetecting means, each having a planar surface and producing an output signal representing an intensity of light I(x,y) at a plurality of points at coordinates (x,y) on said surface referenced to x,y axes of said surface;

directing portions of said light beam onto separate ones of said surfaces, each portion of said light beam having an intensity distribution on the surface onto which it is directed substantially in accordance with an intensity distribution function I'(x,y) having as variables coordinates x and y of points on the corresponding surface and having as constants the radius r at which intensity distribution function I'(x,y) has diminished by a factor of $e^{-2}$ from a point of peak light intensity $I_o$ on said surface, which point of peak light intensity $I_o$ is located at coordinates h and k on the corresponding surface.

determining from the output signal produced by ones of said photodetecting means said intensity of light I(x,y) at ones of said plurality of points (x,y) on surfaces of said ones of said photodetecting means;

determining for ones of said surfaces a combination of values of $I_o$, r, h, and k which substantially minimizes a weighted sum of the squares of I(x,y) less computed values for the intensity distribution function I'(x,y) for said plurality of points (x,y); and ascertaining change in shape of said structure from determined values of h and k for said ones of said surfaces.

20. The method in accordance with claim 19 wherein said intensity distribution function is $$I'(x,y)=I_o\exp\{-2[(x-h)^2+(y-k)^2]/r^2\}$$

where $I_o$ is the value of said peak intensity and r is a distance from said point of peak intensity at which $I'(x,y)=I_o e^{-2}$.

21. The method in accordance with claim 19 wherein the step of ascertaining change in shape of said structure from determined values of h and k for said ones of said surfaces comprises the substeps of:

determining from said combination of values of coordinates h and k for a plurality of said surfaces the parameters defining an estimated path of said light beam, determining from said parameters the coordinates of a reference point on ones of said surfaces, and comparing the determining coordinates of the reference point of at least one of said surfaces to the determined h and k coordinates for said at least one surface, thereby to ascertain changes in shape of said structure.

* * * * *

UNITED STATES PATENT AND TRADEMARK OFFICE
CERTIFICATE OF CORRECTION

PATENT NO. : 4,889,425

DATED : December 26, 1989

INVENTOR(S) : Frank E. Edwards; Stephen W. Wilcken

It is certified that error appears in the above-identified patent and that said Letters Patent is hereby corrected as shown below:

Column 2, line 16, "solidstate" should be --solid-state--.

Column 7, line 12, "8c" should be --18c--.

Column 11, line 19, "There after" should be --Thereafter,--.

Column 12, line 45, after "assumes" delete the comma.

Column 12, line 46, "$z^1$" should be --$z'$--.

Column 14, line 57, "$Sin74_y$" should be --$Sin\theta_y$--.

Column 15, line 17, (equation [32]), above "$\Sigma$" (third occurrence) insert --n--.

Column 17, line 45, "distributing" should be --distribution--.

Column 17, line 51-52, "calculating" should be --calculated--.

Column 18, line 6, "positions" should be --portions--.

Column 18, line 36, "prove it" should be --prevent--.

Column 19, line 42, "$I,(x,y)$" should be --$I'(x,y)$--.

Column 19, line 53, after "less" delete the comma.

Column 19, line 61, after "$r^2$" delete ")" and insert --}--.

Column 20, line 41, "1" should be --I--.

UNITED STATES PATENT AND TRADEMARK OFFICE
CERTIFICATE OF CORRECTION

PATENT NO. : 4,889,425

DATED : December 26, 1989

INVENTOR(S) : Frank E. Edwards; Stephen W. Wilcken

It is certified that error appears in the above-identified patent and that said Letters Patent is hereby corrected as shown below:

Column 20, line 57, "$r^2\}$" should be --$r^2\}$--.

Column 21, line 17, "surface." should be --surface;--.

Column 22, line 7, "$r^2\}$" should be --$r^2\}$--.

Column 22, lines 10-11, "$I'(x-,y)=I_oe^{-2}$." should be

--$I'(x,y) = I_oe^{-2}$.--.

Column 22, line 22, "determining" should be --determined--.

Signed and Sealed this

First Day of February, 1994

Attest:

BRUCE LEHMAN

*Attesting Officer*     *Commissioner of Patents and Trademarks*